March 27, 1973     KOUJI UMEZAWA     3,723,259
PROCESS OF MAKING A PISTON RING
Original Filed Nov. 15, 1971
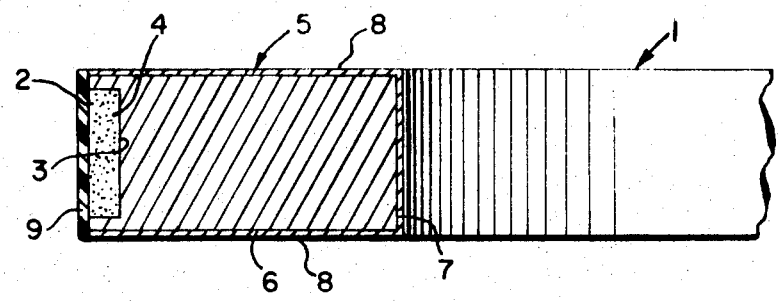

3,723,259
PROCESS OF MAKING A PISTON RING

Kouji Umezawa, Konosu, Japan, assignor to Nippon Piston Ring Kabushiki Kaisha, Tokyo, Japan
Original application Nov. 15, 1971, Ser. No. 88,320. Divided and this application Feb. 22, 1972, Ser. No. 228,054
Int. Cl. C23b 5/48
U.S. Cl. 204—15                                              3 Claims

ABSTRACT OF THE DISCLOSURE

A cast iron piston ring is provided with a friction reducing packing of bonded iron oxide and carbon powder in a groove of its outer circumferential face, and with a hard chromium electrodeposit on all other surfaces by first applying a packing composition including a heat curing bonding agent, thereafter coating the packing with an aqueous polytetrafluoroethylene dispersion, drying and sintering the resin into a continuous film while simultaneously curing the packing, and thereafter electrodepositing chromium, the cured packing being protected against attack by the chromium plating bath by the resin film.

---

This is a division of application Ser. No. 88,320, filed on Nov. 15, 1971, now Pat. No. 3,671,047.

This invention relates to piston rings suitable for automotive internal-combustion engines and to a process of making such piston rings.

In its more specific spects, this invention relates to a piston ring carrying an antifriction packing of bonded iron oxide ($Fe_3O_4$) and carbon powder mixture in a groove of the outer circumferential ring face.

Piston rings provided with such a packing have been found useful in reducing friction in a seal between the piston and the cooperating cylinder at high compression ratios, and to retain its effectiveness after extended service at high piston speeds. The known packings contain waterglass (aqueous sodium silicate) or a thermosetting resin composition as a bonding agent, and require heat treatment at elevated temperature for curing the bonding agent.

It is also known to provide piston rings with chromium electrodeposits for low friction and wear resistance, and it is common good practice to deposit chromium at a Vickers Pyramid Hardness of more than 700, preferably 850 to 1000. However, it has not been possible heretofore to make a piston ring having both an outer circumferential packing of baked iron oxide and carbon while being covered with hard electrodeposited chromium on all or any other surface.

If the piston ring is chromium plated before receiving the iron oxide-carbon powder mixture, the hardness of the electrodeposit is reduced to about 650 VPH in the heat treatment. If the powder is applied and baked prior to electrodeposition, the chromium plating solution corrodes the antifriction material and makes it unsuited for the intended purpose.

It is an object of this invention to provide a piston ring which combines the advantages of a bonded packing of the type described with those of a hard chromium coating on at least one surface other than the outer circumferential surface of the piston ring.

Another object is the provision of a process of making such a piston ring.

It has now been found that the powder mixture may be coated prior to heat treatment with a fluoroplastic resin composition capable of being heated to an adequate curing temperature for the powder mixture, of withstanding attack by the chromium plating bath, and of protecting the packing, and that the heat treated piston ring may thereafter be subjected to chromium plating without attack on the cured packing. The thin film of resin is an effective lubricant under the normal conditions of piston ring use for at least the breaking-in period, and does not interfere with the operation of the cured packing, nor shorten its useful life.

Other features and many of the attendant advantages of this invention will readily be appreciated as the same becomes better understood by reference to the following detailed description of a preferred embodiment when considered in connection with the appended drawing.

The sole figure of the drawing shows a piston ring prepared by the process of the invention in fragmentary section on its axis.

The body 1 of the ring consists of cast iron. It is of generally rectangular cross section, the relatively narrow, outer circumferential face 2 of the piston ring body being formed with a shallow annular groove 3 extending over much of the axial height of the ring.

The groove 3 is filled with a packing 4 of bonded iron oxide and carbon powder. The wide upper and lower radial faces 5, 6 of the piston ring body 1, and the inner, circumferential face 7 are covered with a coating 8 of electrodeposited chromium. A film 9 of polytetrafluoroethylene (TFE) covers the exposed face of the packing 4.

In an actual embodiment of the invention, the piston ring body 1 had an outer diameter of 83 mm., an axial height of 1.9 mm., and a radial width of 3.4 mm. The groove 3 and the packing conformingly received therein had cross-sectional dimensions of 0.5 mm. in the direction of the ring diameter, and 0.45 mm. in the direction of the piston ring axis. The chromium electrodeposit 8 had a thickness of 8 microns, while the polytetrafluoroethylene film had a thickness of 55 microns in the finished piston ring.

In producing the ring, the groove 3 was packed with the conventional mixture of iron oxide, carbon, and waterglass bonding agent. A layer of TFE powder dispersion containing a small amount of temporary binder in its aqueous medium was applied over the exposed portion of the circumferential ring face 2 and the exposed face of the green packing 4, and the ring was thereafter slowly heated to evaporate the water present, at about 200° C. in one hour, and thereafter simultaneously to cure the TFE layer which coalesced into a gel, and the powder mixture. The ultimate temperature was somewhat below 390° C. but above the sintering temperature for the TFE composition. The coated piston ring was then cooled slowly to solidify the TFE layer into a continuous film.

It was next immersed in a chromium plating bath and made the cathode in the bath until chromium was deposited to the average thickness indicated above. The bath, conventional in itself, 250 g./l. chromium trioxide, approximately 1.4 g./l. sulfuric acid, and 5.5 g./l. sodium fluosilicate. Its temperature was 65±2° C. and the cathode current density was controlled at 60 to 80 amps./dm.$^2$ Careful examination of a cross section showed that none of the chromium plating solution had penetrated into the packing, and thus could not cause oxidation of the $Fe_3O_4$, and the resulting loss of coherence which could cause the packing to be dislodged during service.

The piston ring prepared as described performed well in extended service under taxing conditions.

While TFE is preferred at this time as a material for the fluoroplastic film 9, the several other fluoroplastics now in commercial use, including polychlorotrifluoroethylene, fluorinated ethylene propylene polymer, or polyvinylidene fluoride may be substituted with the necessary changes in processing conditions, particularly in the sintering temperature.

The thickness of the fluoroplastic film 9 may be chosen to suit requirements, that is, adequately to protect the cured powder mixture, and the optimum value depends on variables relating both to the piston ring and to the cylinder in which the piston ring is to be used. Some experimentation thus is unavoidable, but a thickness of approximately 50 microns or more in the cured fluoroplastic and a corresponding thickness of the applied dispersion will normally give good results. Similar considerations hold for the chromium electrodeposit, and those skilled in the art will modify the procedure outlined above to meet specific requirements. A chromium layer less than 5 microns thick is rarely adequate. The metal employed for the body portion of the ring may require changes in the chromium thickness in an obvious manner.

It should be understood, therefore, that many modifications and variations of the present invention are possible in the light of the above teachings, and that, within the scope of the appended claims, the invention may be practiced otherwise than as specifically described.

What is claimed is:

1. In a process of making a piston ring in which a piston ring body having an outer grooved, circumferential face is packed with a mixture of iron oxide, carbon, and a bonding agent filling a groove in said face, and said mixture is cured at elevated temperature, the improvement which comprises:

(a) coating the packed mixture prior to said curing with a layer of a fluoroplastic resin composition capable of being heated to said elevated temperature and responsive to said heating by forming a continuous film of fluoroplastic resin;
   (b) heating the piston ring body carrying said packing and said resin composition to a temperature sufficient to cure said pacikng and to convert said composition to said film; and
   (c) thereafter making said piston ring body the cathode in a chromium plating bath under conditions to deposit chromium having a Vickers Pyramid Hardness greater than 700 on another face of said body.

2. In a process as set forth in claim 1, said fluoroplastic resin being polytetrafluoroethylene, polychlorotrifluoroethylene, fluorinated ethylene propylene ploymer, or polyvinylidene fluoride.

3. In a process as set forth in claim 1, said fluoroplastic resin being polytetrafluoroethylene.

References Cited
UNITED STATES PATENTS

| 3,051,633 | 8/1962 | Paull et al. | 204—25 X |
| 3,683,477 | 8/1972 | Sugahara | 204—15 X |

GERALD L. KAPLAN, Primary Examiner

U.S. Cl. X.R.
204—25, 29